United States Patent [19]
Wason

[11] 3,893,554
[45] July 8, 1975

[54] TORQUE LIMITING CLUTCH
[76] Inventor: Thomas D. Wason, 313 W. Park Dr., Raleigh, N.C. 27605
[22] Filed: June 7, 1974
[21] Appl. No.: 477,446

[52] U.S. Cl.............. 192/56 C; 64/30 E; 192/41 S
[51] Int. Cl.² .................... F16D 43/21; F16D 41/20
[58] Field of Search........... 192/41 S, 56 C; 64/30 E

[56] References Cited
UNITED STATES PATENTS
2,626,029  1/1953  Gutterman ....................... 192/56 C
2,723,013  11/1955  Rogers et al ...................... 192/41 S
3,477,486  11/1969  Modrey ........................ 192/41 S X Primary Examiner—Allan D. Herrmann
Attorney, Agent, or Firm—Mills and Coats

[57] ABSTRACT

In abstract, a preferred embodiment of this invention is a one piece coil clutch which will slip at a predetermined torque and while slipping will transmit that torque from one axially aligned shaft to another. The torque remains constant from initial slippage through continuous slippage thereby preventing the sharp jerk which is usually characteristic of friction type clutches.

8 Claims, 6 Drawing Figures

TORQUE LIMITING CLUTCH

This invention relates to clutch mechanisms and more particularly to torque limiting clutches of the one piece coil type.

In the past, various spring type clutches have been developed for use with mechanical mechanisms such as drive shafts. These mechanisms have been usually operative relative to a fixed torque disengagement means. These prior known spring type clutches have not been usable in connection with co-axial shafts with a steady slippage being accomplishable upon reaching of a predetermined torque differential.

Heretofore, torque limiting clutches for co-axial shafts have been relatively complicated mechanisms with associated expensive production costs. This is particularly true for torque limiting mechanisms for use on various types of power driven devices wherein motor damage can be caused by stalling overload. These devices would include, but certainly not be limited to, powered hand type tools and motor driven applicances such as hedge trimmers, drills, blenders, mixers and the like.

After much research and study into the above mentioned problems, the present invention has been developed to provide a torque limiting clutch capable of limiting the torque transmitted from one co-axial shaft to another without disengaging the shafts when the designated torque is reached. This device can operate with slippage while at the same time transmitting a constant predetermined torque between the two shafts. This allows a driven shaft to rotate at a lesser speed than its co-axial drive shaft while at the same time maintaining a positive drive force. In addition, the torque limiting clutch of the present invention is so constructed that a limited amount of axial misalignment between the drive and driven shafts can occur without adversely affecting the clutch coupling therebetween.

In view of the above, it is an object of the present invention to provide a torque limiting clutch between two shafts which does not disengage but allows slippage only to a predetermined torque value.

Another object of the present invention is to provide a torque limiting clutch which limits the amount of torque transmitted.

Another object of the present invention is to provide a torque limiting clutch wherein the torque action releases said clutch.

A further object of the present invention is to provide a clutch wherein torque limiting is not a function of the coefficient of friction but of torque sensing and feed back properties inherent in the device.

An even further object of the present invention is to provide a shaft coupling, torque limiting, clutch operative under at least limited shaft misalignment conditions.

Another object of the present invention is to provide a torque limiting clutch which is inexpensive and yet a highly efficient motor overload preventing means.

Another object of the present invention is to provide a torque limiting clutch adaptable to appliances and power tool motor to prevent overloads thereof.

Other objects and advantages of the present invention will become apparent and obvious from a study of the following description and the accompanying drawings which are merely illustrative of the present invention.

Figure 1:
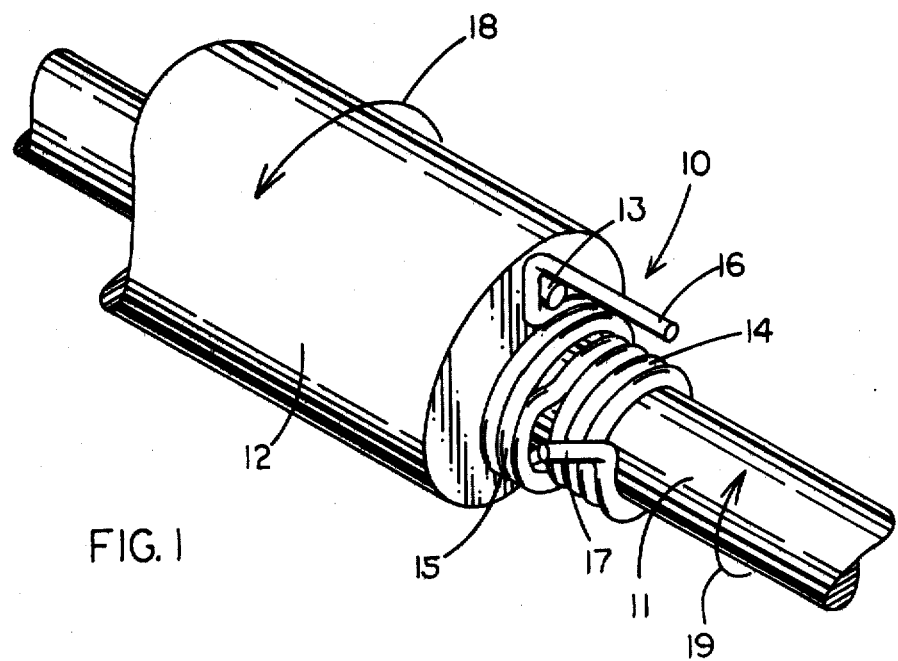
FIG. 1 is a perspective view of the torque limiting clutch of the present invention disclosing the same in normal low torque load condition.

With further reference to the drawings, the torque limiting clutch of the present invention is indicated generally at 10 and is preferably made from a single piece of spring steel. This clutch is so shaped to form a clutch coil portion 14 adapted to place, under driving conditions, a tight, gripping force on driven shaft 11 as seen clearly in FIGS. 1 and 2. This drive is unidirectional in the manner of conventional coil spring friction ratchets and hence slips freely under reversed torque. Drive shaft 12, which is rotatively mounted on driven shaft 11 and is co-axial therewith, includes a drive pin 13. This drive pin is adapted to engage drive arm 16 which extends from torsion coil portion 15.

As can clearly be seen in the Figs., the torsion coil portion 15 is larger in formed interior diameter than clutch coil portion 14. Thus, it can be seen that drive arm 16 can move circumferentially relative to coil 14 without coiling down the interior diameter of portion 15 enough to bind on shaft 11.

A clutch coil release arm 17 is provided which extends outwardly from clutch coil portion 14 of the clutch 10 of the present invention. When a predetermined force is applied to this arm in the same direction as twisting moment 18, it will uncoil clutch coil 14, allowing slippage of shaft 11. This release arm 17 is activated as hereinafter set forth.

As mentioned above, shaft 11 is free to rotate relative to shaft 12. If shaft 12 is driven in the direction indicated at 18, drive pin 13, being in engagement with drive arm 16, will cause the clutch 10 to rotate with said shaft 12. Since the clutch coil portion 14 is so sized interiorly that at least a light gripping force is applied to shaft 11, rotation of clutch 10 resulting from drive rotation of shaft 12 will cause the clutch coil 14 to wrap more tightly above shaft 11, transmitting torque thereto. As long as the predetermined limit torque is not approached, shaft 11 will not slip relative to clutch coil portion 14. The torque couple will cause rotation of drive arm 16 toward release arm 17 through the action of the torsional spring coil portion 15.

Figure 2:
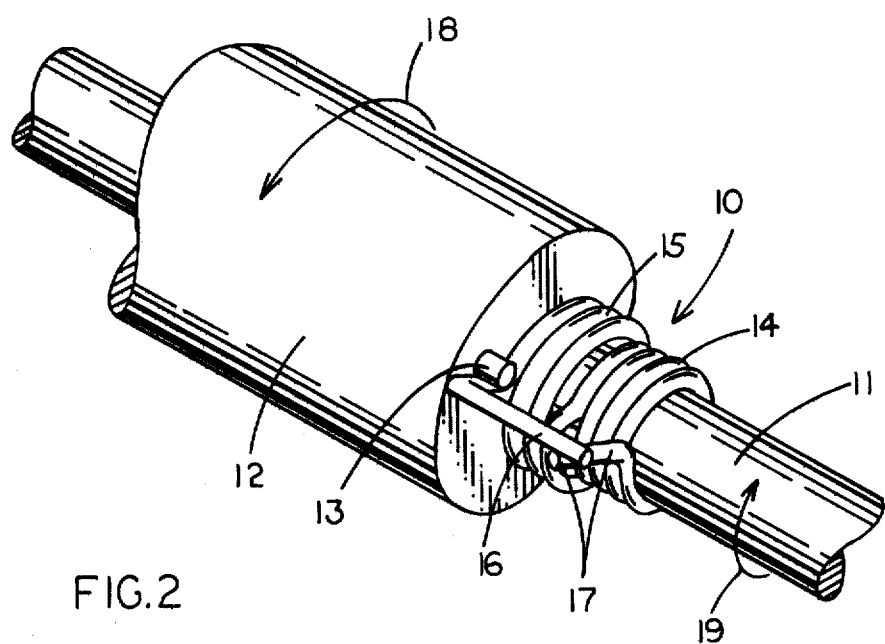
FIG. 2 is a perspective view of the torque limiting clutch of the present invention showing the same in operative torque slippage condition.

The spring action in the torsion coil portion 15 of the clutch 10 is of a predetermined value so that a predetermined amount of torque differential is required before arm 16 will move against such torsion spring from the relative rest position shown in FIG. 1 to the clutch coil release position shown in FIG. 2.

As the torque between shafts 12 and 11 increases due either to increasing rotative force on shaft 12 or increased resistance to rotation on shaft 11, the pressure of drive arm 16 is increased against clutch release arm 17 as seen particularly clearly in FIG. 2. As this torque increases, drive arm 16 tends to move release arm 17 even further in the direction of arrow 18 which, because of the helical configuration of clutch coil 14, tends to unwind such coil to the point of increasing the interior diameter thereof thus either releasing or reducing the gripping force of said coil about shaft 11. As this happens, slippage of shaft 11 can occur relative to clutch 10 which is carried through drive pin 13 by shaft 12. Attempts to further increase above the predetermined limit the torque couple, indicated by arrows 18 and 19, further loosens clutch coil 14, increasing the slippage of shaft 11, hence increasing the difference in rotational speed between shafts 11 and 12. As the torque forces between the two shafts decreases, clutch coil 14 will again coil down on shaft 11 gripping the same for reestablishment of proper predetermined gripping drive between the two shafts.

From the above, it can readily be seen that as long as the predetermined torque condition exists, the clutch will continue to slip as required and yet progressively tighten back down to the point of nonslip drive as the torque decreases. Also at this point it should be noted that because of the greater diameter of the interior of torsion coil portion 15 than shaft 11, a spring isolator effect is created between shafts 11 and 12 thus absorbing minor torque shocks therebetween without affecting the operation of the overall clutch mechanism 10. Thus it can be seen that the device of the present invention not only acts as a torque limited clutch but also as a shock isolating device.

Variation of the parameters of wire diameter, the number or fraction of coils in torsion coil 15 and the relative angular displacement between drive arm 16 and clutch coil release arm 17 permit moderately independent predetermination of the steady state or torque limiting and dynamic characteristics of the coupling.

Figure 5:
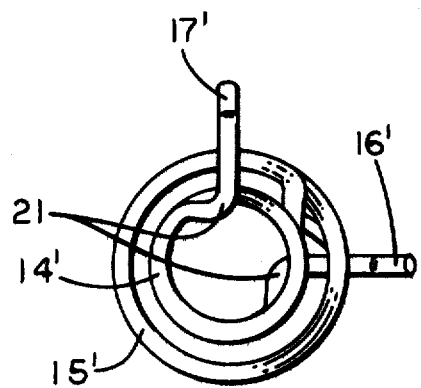
FIG. 5 is an end elevational view of a torque limiting clutch of the type shown in FIG. 3.
Figure 3:
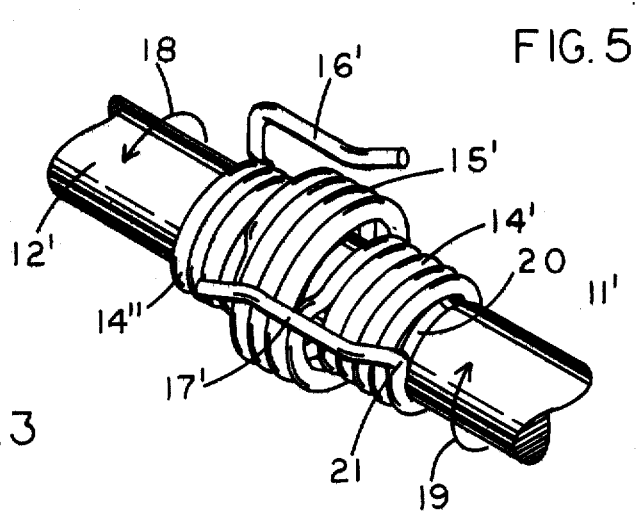
FIG. 3 is a perspective view of the torque limiting clutch of the present invention showing the same being used with similar sized co-axial shafts wherein such clutch also acts as a coupling means.
Figure 4:
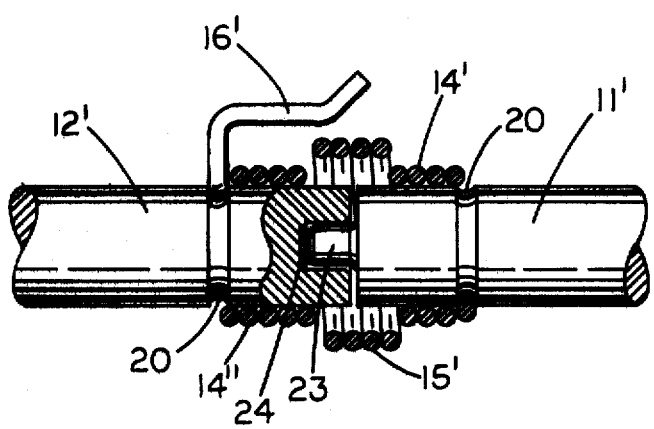
FIG. 4 is a partially cutaway view of FIG. 3.

The modification of the present invention shown in FIGS. 3–5 is as the embodiment of FIGS. 1–2 preferably formed from a single piece of spring steel. The shaft gripping clutch coil 14' and 14" function in the same way as clutch coil 14 of the originally described embodiment. Likewise, coil 15' functions as described coil 15. Rather than a drive pin such as that indicated at 13 connecting the clutch 10 with shaft 12, the normal gripping action of clutch coil 14" serves the purpose.

To operate the clutch for torque limiting purposes, arms 16' and 17' function as arms 16 and 17 in the originally described embodiment.

The FIGS. 3–5 embodiment in addition includes a groove 20 on both shafts 11' and 12' which retainingly receives groove engaging portion 21. By close examination of FIGS. 3, 4 and 5, it is obvious that portions 21 prevent the clutch 10' from slipping longitudinally along the shafts thus possibly rendering the clutch inoperative.

Figure 6:
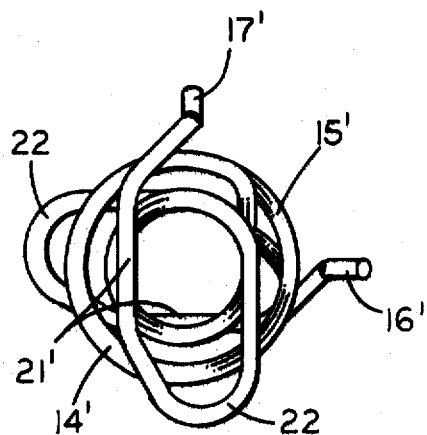
FIG. 6 shows a modified configuration of the clutch of FIG. 3, including counterbalancing loops for high speed, low vibration operation.

A slight modification of the second embodiment is disclosed in FIG. 6 wherein counter balancing loops 22 are provided opposite arms 16' and 17'. These counter balancing loops are so proportioned that the exteriorly projecting weight thereof is for all practical purposes the same as the weight of the oppositely disposed arm. The purpose of the counter balancing loops 22 are to give a balanced effect during high speed rotation to prevent vibration from developing thus giving more versatility to the disclosure of the present invention. The remainder of the clutch of the modification of FIG. 6 is the same as the second described modification and, of course, functions in the same manner.

Although, because of the enlarged size of the torsion coil portion 15' of the second and third modifications, shafts 11' and 12' do not have to be in exact axial alignment. Because of the problems that would be encountered if the misalignment were of a substantial amount, particularly during high speed operations, a guide nipple 23 is preferably provided on the end of one of the shafts such as shaft 11' as clearly seen in FIG. 4. A guide socket 24 is provided in the adjoining shaft or shaft 12' as also seen in FIG. 4. If the connection between nipple 23 and socket 24 is somewhat loose, either parallel or angular misalignment can occur (and even at times may be desirable) and yet the clutch will continue to function as designed. This feature of the present disclosure becomes obvious from a close study of FIG. 4.

From the above, it is obvious that the present invention has the advantage of providing an inexpensive and yet highly efficient torque limiting clutch which dampens the jerking action of sudden surging or braking while providing self-adjusting, continuous torque slip when predetermined conditions exist. Another advantage of the present invention is to provide a torque limiting clutch which is operative between two generally axially aligned shafts but which will continue to function even with limited parallel or angular misalignment.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A torque limiting device comprising: a first shaft; a second shaft juxtaposed to and in general axial alignment with said first shaft; a clutch means including a coil portion encircling said first shaft in gripping contact therewith; a second coil portion continuous with said first portion and encircling said first shaft, said second portion having an interior diameter greater than the diameter of the said encircled shaft; means extending from said second coil into drive contact with said second shaft; means extending from said first coil in normally spaced relation to said means extending from said second coil in such a position that, under torsion, said arms travel in a path so that they operatively contact each other when under predetermined torque whereby said second extending means, under predetermined load, will move against and exert pressure on said first extending means thereby at least partially unwinding the same to at least partially release the gripping pressure of said first coil on said first shaft thereby allowing rotational slippage between said first and second shafts.

2. The device of claim 1 wherein said first shaft passes through said second shaft.

3. The device of claim 2 wherein the drive contact between the means extending from said second coil and said second shaft is a drive pin.

4. The device of claim 1 wherein the clutch means is formed from a single piece of spring steel.

5. A torque limiting device comprising: a first shaft; a second shaft juxtaposed to said first shaft and in general axial alignment therewith; clutch means including at least two coil portions, at least one each encircling, in normal gripping contact, a portion of each shaft; an enlarged coil portion attached on either side to said shaft coils and having an interior diameter normally greater than said shafts whereby no gripping effect is exerted thereon; arm means extending outwardly from the ends of each of said shaft coils farthest from said enlarged coil, said arms being so disposed that, when excessive torque is applied to said shafts, said arms will travel in such a path relative to each other that contact will be made therebetween thereby causing at least partial unwinding of said shaft coils to allow lessening of their gripping effect.

6. The device of claim 5 wherein means are provided for controlling the alignment of said shafts one relative to the other.

7. The device of claim 6 wherein the controlling means is a guide nipple on the end of one shaft and a guide socket on the end of the other shaft.

8. The device of claim 5 wherein a loop is provided on the opposite side of each of said gripping coils opposite that coil's respective arm whereby a rotatively balanced clutch is provided.

* * * * *